April 14, 1931. O. FORST 1,800,991
MILLING MACHINE FOR MILLING SLOTS BY SLABBING CUTTERS OR END MILLS
Filed Feb. 15, 1928 2 Sheets-Sheet 1
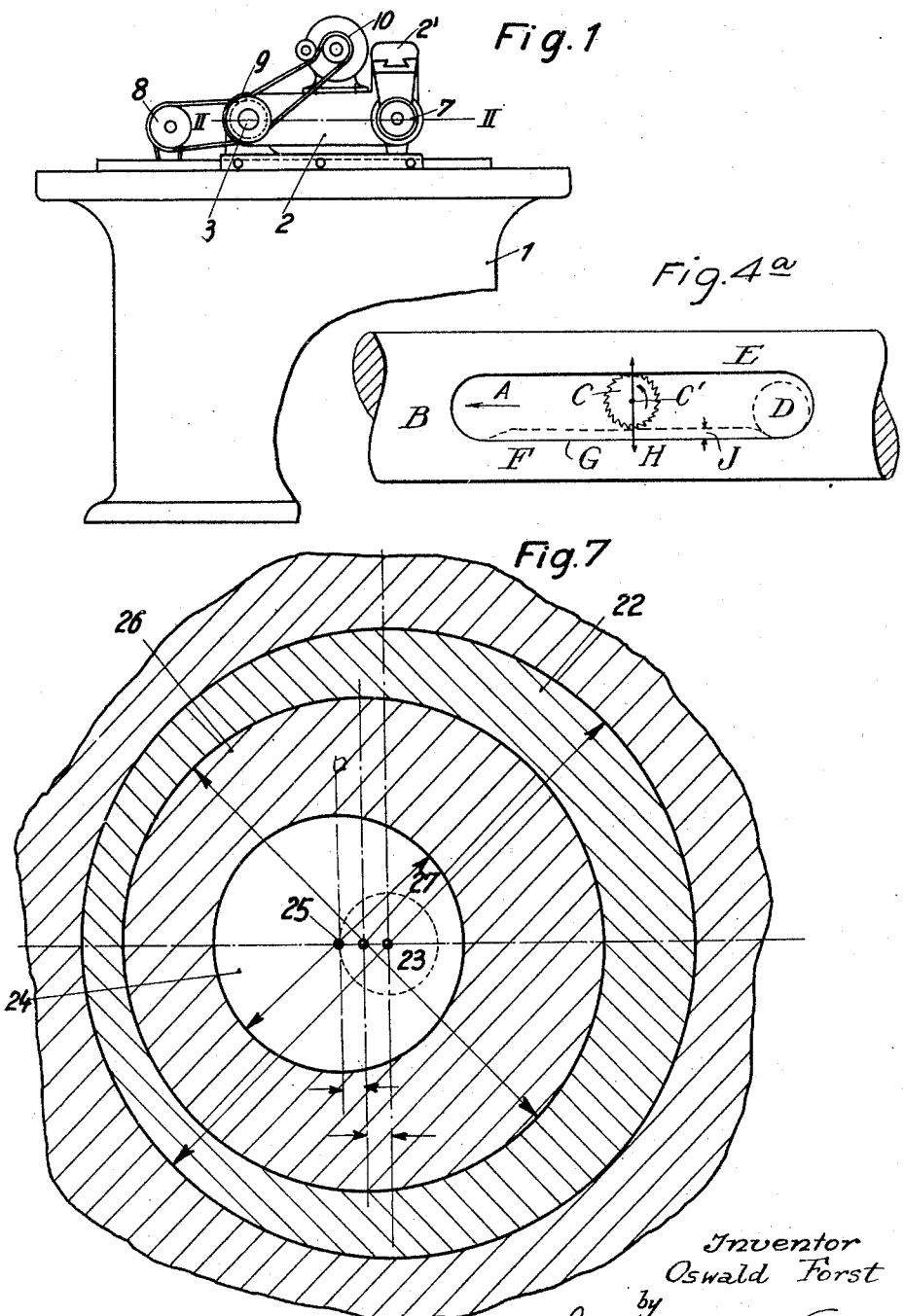
Inventor
Oswald Forst
by
Lowe, Kehlenbeck & Farley
Attorneys

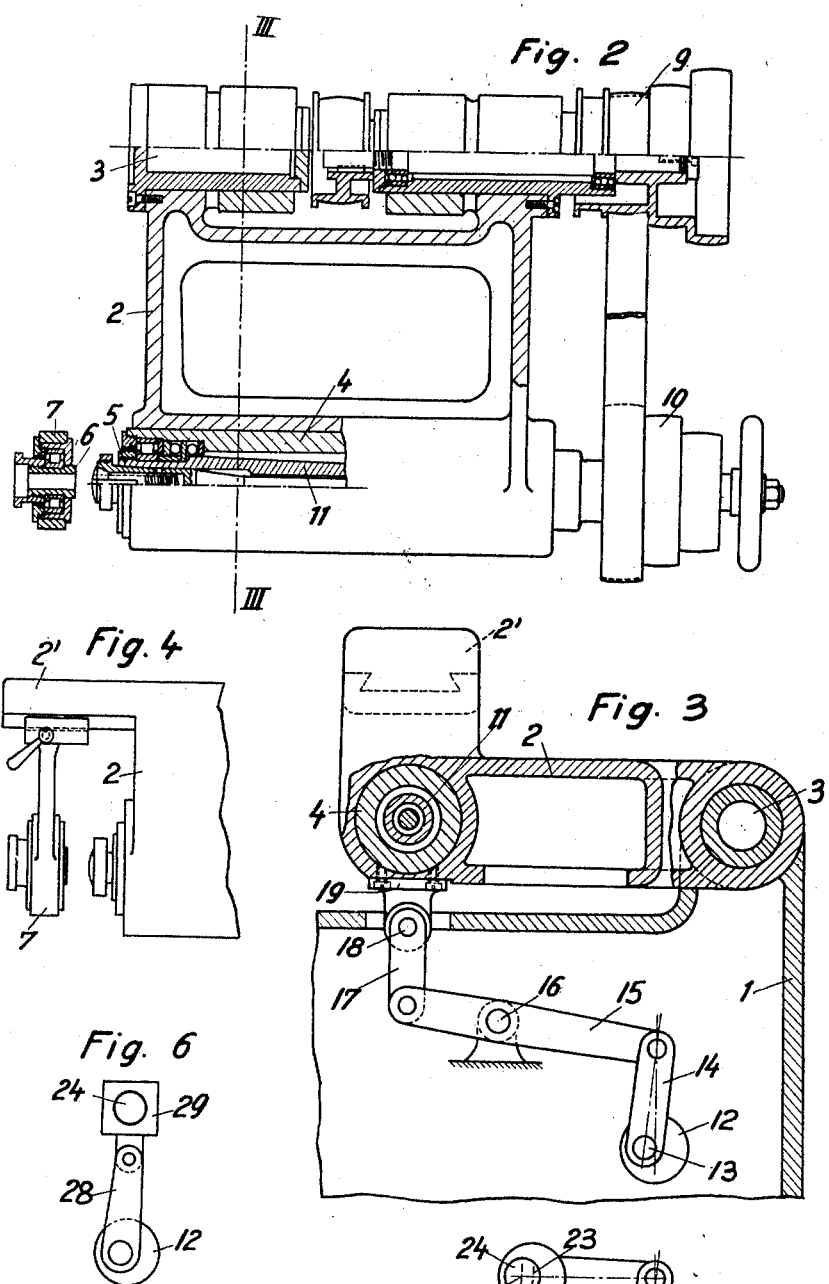

Patented Apr. 14, 1931

1,800,991

UNITED STATES PATENT OFFICE

OSWALD FORST, OF SOLINGEN, GERMANY

MILLING MACHINE FOR MILLING SLOTS BY SLABBING CUTTERS OR END MILLS

Application filed February 15, 1928, Serial No. 254,360, and in Germany February 22, 1927.

My invention relates to milling machines and more particularly to machines for milling slots by slabbing cutters or end mills.

It is an object of my invention to reduce transverse forces and the power input for feeding, to prevent creeping of the cutters and to facilitate the removal of the chips.

To this end, in addition to the rotation and the feed imparted to the cutter I impart reciprocation to it at right angles to its feeding movement and transversely to its axis of rotation.

I may employ slabbing cutters supported at both ends for milling slots, or end mills supported at one end only for milling splines etc., in order to mill slots etc. by feeding the milling cutters transversely to their axis, as for splining shafts.

This operation as performed heretofore involves cutting on half the perimeter of the cutter, i. e. on that half thereof which lies in the direction of feed of the cutter, and this not only increases the transverse forces but also brings about a tendency of the cutter to creep at right angles to the feed so that the slots etc. are enlarged at their ends. Obviously, with the cutter cutting on half its perimeter the power required for feeding is considerable and the removal of the chips is interfered with.

In accordance with the present invention these difficulties are overcome by imparting a third movement to the cutter in addition to its rotation and feed, as described above, such third movement being transverse to both the direction of feed and the axis of the cutter, so that the cutter is caused to cut at most only on a quarter of its perimeter at any instant, the active cutting surface becoming a maximum at both ends of the transverse reciprocation of the cutter, while during such reciprocation the active cutting surface extends over only a comparatively small portion of the perimeter of the cutter, the length of this portion being a function of the chip thickness and of the perimeter of the cutter.

It is another object of my invention to provide means for making up for the reduction of the diameter of the cutters due to wear and regrinding, and to this end I make the stroke of the reciprocation variable.

Reciprocation may be effected by any suitable means. I prefer crank drives as they operate without jerks, but cam drives and other mechanisms may also be provided.

In the accompanying drawings, several embodiments of my invention are illustrated diagrammatically by way of example.

Fig. 1 is an elevation of a complete machine.

Fig. 2 is a section on the line II—II in Fig. 1, drawn to a larger scale,

Fig. 3 is a section on the line III—III in Fig. 2,

Fig. 4 is a detail,

Fig. 4a is a diagrammatic view illustrating the operation of the cutter,

Figs. 5 and 6 illustrate two modifications of the mechanism for imparting reciprocation to the cutter, and Fig. 7 is a section on a large scale showing means for varying the stroke of the reciprocation.

Referring now to the drawings, and first to Figs. 1 to 4, 1 is the frame of a milling machine, 2 is a rocking arm, and 3 is a hollow shaft about which the arm is rocked on the frame 1. The manner in which the rocking arm 2 is carried on the frame is not described in detail as it forms no part of the present invention.

4 is a sleeve inserted in the free end of the arm 2, 5 is a chuck at the end of the sleeve for holding the cutter, 6 is a guide bush arranged in line with the chuck or cutter holder 5 and positioned at the end of a bracket 7, and 2' is an extension projecting upwardly from the free end of the arm 2 and serving as guide for the bracket 7. The cutter is thus provided with two points of support, i. e. the holder 5 and the bracket 7.

As mentioned, I may employ any type of milling cutters, fragile cutters being supported by the bush 6 in the bracket 7 at their free end, and end mills being chucked at one end. I may also provide combined milling cutters and drills, by which first a hole is drilled in a shaft or other part, and the hole is then extended or enlarged into a slot or spline.

8 is a pulley on the frame 1, 9 is a pulley on the shaft 3, and 10 is a step pulley on an extension of the sleeve 4. The pulley 8 is rotated by any suitable means, not shown, and in turn imparts rotation to the step pulley 10 through the medium of a belt, whereby a hollow shaft 11 integral with or connected to the holder, and upon which the pulleys are mounted, is rotated.

12 is a crank, which is carried in suitable bearings in the frame 1 (Fig. 3), 13 is its pin, 14 is a link on the pin, 15 is a double-armed lever fulcrumed at 16 to which the link 14 is connected at one end, 17 is a link at the other end of the lever 15, 18 is a pin at the end of the link, and 19 is a bracket in which the pin 18 is secured and which is attached to the rocking arm 2. The radius of the crank 12 may be varied by any suitable means, not shown.

Referring now to the modification shown in Fig. 5, there is shown an eccentric for reciprocating the chuck or holder, such eccentric replacing the rocking arm 2 shown in Fig. 3. 12 is a crank, and 20 is a link on the pin of the crank. The link 20 is pivotally connected with an arm 21 filed to a shaft 22 which is mounted to rock about an axis 23, and 24 is an arbour supporting the chuck or holder 5. The axis 25 of the arbour 24 is arranged eccentrically with respect to the axis 23. When the crank 12 rotates, the axis 25, and consequently the chuck, oscillates about the axis 23. The stroke or amplitude of the oscillation can be varied by adjusting the pin of the crank 12, or the pitch of the axes 23, 25, or both. Means for varying the pitch will presently be described.

Referring now to embodiment shown in Fig. 6, 29 is a slide on which the arbour 24 of the chuck is carried, 12 is a crank, and 28 is the connecting rod of the system. Rotation of the crank 12 causes reciprocation of the slide 29.

Means for varying the pitch of the axes 23 and 25 may comprise a sleeve 26 (Fig. 7) which is inserted between the shaft 22 and the arbour 24 in eccentric position. 27 is the axis of the sleeve 26. With the eccentrics 23, 27 and 25, 27 equal, it is possible to vary the eccentricity by turning the sleeve 26, from zero to the maximum 23, 25, shown in Fig. 7, as both eccentrics are added in the illustrated position of the parts.

The peculiar novel operation of my cutter will be understood best by reference to the diagrammatic view, Fig. 4a, in which C designates the cutter and B a blank in which a slot is to be produced by said cutter. In addition to rotating about its own (longitudinal) axis, the cutter C has a feeding movement, in the direction of the arrow A, to produce the slot or groove in the blank B. At the beginning of the machining, the blank is bored or drilled to produce therein a hole D of sufficient size to receive the cutter C. If the cutter had only the two movements referred to above, it would produce in the blank a slot or groove of uniform width at its central portion, but having enlarged rounded ends, as indicated by dotted lines; that is to say, the upper boundary of said slot or groove would be the upper horizontal line E, while its lower boundary would be the dotted line F, the slot or groove being thus narrower at its central portion than at its ends. The enlargements at the ends are due to the fact that at the beginning of the operation the cutter, owing to the elasticity of the several parts of the machine and to the unavoidable lost motion in the machine, has a tendency to creep crosswise to the direction of feed. At the end of the groove, the cutter drops to the same amount that it has crept at the beginning, since the lifting tendency or power exerted on the cutter ceases as soon as the feeding motion stops. The operation referred to above, producing a slot of greater width (height) at the ends than at the central portion, is not satisfactory, since the result desired is the production of a slot or groove of uniform width (height) from end to end; in other words, the lower boundary of the slot or groove should be as indicated by the solid lower line G. According to my invention, the cutter receives a third movement, which is a to-and-fro movement in a direction transeverse to the direction of feed indicated by the arrow A, and also transverse to the axis of rotation C', of the cutter C. In the particular embodiments illustrated, this to-and-fro movement, in the direction of the arrow H, is imparted to the cutter C by the oscillation of the arm 2 carrying the holder 5, or of the shaft 22 carrying the holder 24 (Fig. 5), or by the reciprocation of the slide 29 carrying the holder 24 (Fig. 6). These to-and-fro movements are made of such an amplitude that the lower boundary of the slot or groove produced by the cutter will be as indicated at G; in other words, such amplitude is substantially equal to the distance between the lines F and G, as indicated at J.

Obviously, I may provide other means for reciprocating the cutter and for effecting movement at right angles to the feed. Nor am I limited to the machine illustrated but my invention may be applied to any machines in which it is desired to displace a cutter as described.

I claim:

1. In a milling machine, the combination of a cutter holder arranged to be moved relatively to a work-piece in the direction of feed of a cutter, means for imparting rotation to said holder, and means for imparting to said cutter holder, simultaneously with its feeding movement, a to-and-fro movement transverse to the direction of feed and to the axis of rotation of the cutter.

2. In a milling machine, the combination of a cutter holder arranged to be moved relatively to a work-piece in the direction of feed of a cutter, means for imparting rotation to said holder, means for imparting to said cutter holder, simultaneously with its feeding movement, a to-and-fro movement transverse to the direction of feed and to the axis of rotation of the cutter, and means for varying the amplitude of such to-and-fro movement.

3. In a milling machine, the combination of a frame, a rock arm pivoted on said frame, a cutter holder carried by said arm and adapted to be moved relatively to a work-piece in the direction of feed of a cutter, and means for rocking said arm whereby, simultaneously with the feeding movement of said holder, oscillatory movement is imparted to said holder transversely to the direction of feed and to the axis of rotation of the cutter.

4. In a milling machine, the combination of a frame, an oscillatable element carried by said frame, an eccentric bearing supported by said element, a cutter holder carried by said bearing and adapted to be moved relatively to a work-piece in the direction of feed of a cutter, means for varying the position of said bearing with respect to said element, and means for imparting to said element, simultaneously with the feeding movement of said holder, oscillation transversely to the direction of feed and to the axis of rotation of the cutter.

5. In a milling machine, the combination of a frame, a slide on said frame, a cutter holder carried by said slide and adapted to be moved relatively to a blank in the direction of feed of a cutter carried by said holder, and means for imparting to said slide, simultaneously with the feeding movement of the holder, reciprocation transversely to the direction of feed and to the axis of rotation of the cutter.

In testimony whereof, I have signed my name to this specification, this 31st day of January, 1928.

OSW. FORST.